US008259560B2

(12) United States Patent
Chauncey et al.

(10) Patent No.: US 8,259,560 B2

(45) Date of Patent: Sep. 4, 2012

(54) COMMUNICATION SYSTEM ALLOCATING PILOT SUB-CARRIERS AND RELATED METHODS

(75) Inventors: David Chauncey, Fairport, NY (US); Mitel Kuliner, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 560 days.

(21) Appl. No.: 12/201,082

(22) Filed: Aug. 29, 2008

(65) Prior Publication Data

US 2010/0054194 A1 Mar. 4, 2010

(51) Int. Cl.
*H04J 11/00* (2006.01)

(52) U.S. Cl. ......................... 370/208; 370/329; 375/260

(58) Field of Classification Search .................. 370/208, 370/201, 310, 328, 252, 253; 375/267, 295, 375/316, 346

See application file for complete search history.

(56) References Cited

U.S. PATENT DOCUMENTS

| | | | | |
|---|---|---|---|---|
| 7,167,684 | B2 | 1/2007 | Kadous et al. | 455/67.13 |
| 7,292,651 | B2 | 11/2007 | Li | 375/316 |
| 2004/0062193 | A1* | 4/2004 | Ma et al. | 370/208 |
| 2005/0180354 | A1 | 8/2005 | Cho et al. | 370/328 |
| 2005/0271027 | A1* | 12/2005 | Kim et al. | 370/343 |
| 2007/0263743 | A1 | 11/2007 | Lee et al. | 375/267 |
| 2008/0227386 | A1* | 9/2008 | Dayal et al. | 455/7 |
| 2008/0298316 | A1* | 12/2008 | Bitran et al. | 370/329 |
| 2009/0232230 | A1* | 9/2009 | Hung et al. | 375/260 |
| 2009/0305714 | A1* | 12/2009 | Tanigawa et al. | 455/450 |
| 2010/0246475 | A1* | 9/2010 | Naden et al. | 370/315 |

* cited by examiner

*Primary Examiner* — Gary Mui

(74) *Attorney, Agent, or Firm* — Allen, Dyer, Doppelt, Milbrath & Gilchrist, P.A.

(57) ABSTRACT

A communication system may include a wireless communications device having a wireless transceiver and a controller cooperating therewith, and a wireless base station having a wireless transceiver and a controller cooperating therewith for communicating with the wireless communications device using orthogonal frequency-division multiplexing (OFDM) based upon pilot sub-carriers. The controller of the wireless base station may randomly allocate the pilot sub-carriers over time.

20 Claims, 3 Drawing Sheets

COMMUNICATION SYSTEM ALLOCATING PILOT SUB-CARRIERS AND RELATED METHODS

FIELD OF THE INVENTION

The present invention relates to the field of communication systems, and, more particularly, to communication systems using sub-carriers and related methods.

BACKGROUND OF THE INVENTION

A typical wireless communication system may comprise a plurality of wireless communications devices transmitting and receiving messages with each other. These messages are typically arranged in formatted groups of data called frames. Each frame may comprise a header and a payload. The header may be used by the wireless communication system for routing the data within the frame to the desired recipient, whereas the payload represents the data generated by a user to be transmitted.

An advantageous wireless communication system is IEEE 802.16a-e (WiMAX), for example. The WiMAX wireless communication system typically includes a wireless base station and a plurality of wireless communications devices communicating therewith. Moreover, the WIMAX wireless communication system is typically based upon a frame structure that is defined by a plurality of sub-carriers at different frequencies and a plurality of symbols at different transmission times.

The wireless base station logically allocates data for transmission to each of the wireless communications devices in the system on to the sub-carriers, i.e. subchannelization. Typically, a wireless communications device is allocated a plurality of sub-carriers that are adjacent in the frequency domain, each group of sub-carriers including at least one pilot sub-carrier (pilot tone) to define a sub-carrier group (subchannel). The pilot sub-carriers typically are used for network entry, more particularly, not for network entry entirely but for the ranging process, which is part of network entry in WiMAX. Ranging is the generic process by which WiMAX tailors its wireless properties for best performance under the current conditions for transmitter/receiver synchronization, and ranging, for example. In other words, the pilot sub-carriers may be important for efficient operation of the WiMAX wireless communication system.

As wireless communication systems have become more prevalent, a robust security infrastructure has become desirable. Several approaches to developing such a security infrastructure have been disclosed. For example, the messages transmitted in the wireless communication system may be encrypted using an encryption algorithm, for example, Wired Equivalent Privacy (WEP), Advanced Encryption Standard (AES), and Data Encryption Standard (DES).

Although typical encryption of messages in the wireless communication system may provide for security of the payload data of a frame, there may be several security drawbacks to the typical encrypted wireless communication system. One such drawback may be the lack of security for the actual transmitted frames. In other words, a system infiltrator, for example, an intentional interfering device, may listen to the communications of the system and sniff transmitted frames. In particular, in WiMAX wireless communication systems, the intentional interfering device may determine the corresponding frequencies of the pilot sub-carriers. Once known, the intentional interfering device may concentrate narrowband interference at those frequencies and render the pilot sub-carriers indiscernible to the wireless communications devices of the system, thereby possibly reducing the operational efficiency of the WiMAX communication system.

Particularly, the pilot sub-carriers in the WiMAX 802.16d standard are static. Hence, a WiMAX 802.16d wireless communication system may be susceptible to intentional interference. Although the WiMAX 802.11e standard does provide modification features for the pilot sub-carrier, the changes in pilot sub-carrier location (in the frequency domain) may be made during system set up. In other words, the re-allocation of pilot sub-carriers may cause the wireless communication system downtime. This may translate into increased latency in communications, which results in lower data rate as experienced by a user and performance decline in the user's applications. Moreover, this approach may: cause the wireless communication system to be reconfigured, use customized bandwidth provisioning and resource allocation, and render the wireless communication system non-interoperable or difficult to integrate with other systems.

An approach to sub-carrier allocation is disclosed in U.S. Patent Publication No. 2005/0180354 to Cho et al. This approach allocates sub-carriers based upon the type of data throughput requested by the user, i.e. dynamic or static. Another approach is disclosed in U.S. Patent Publication No. 2007/0263743 to Lee et al. This approach includes partitioning orthogonal frequency-division multiple access (OFDMA) sub-carrier groups and symbols based upon a basic pilot pattern generated by a specific reference, allocating the sub-carrier group based upon the partitioned sub-carrier groups and the symbols, hopping the sub-carrier groups according to a hopping pattern, allocating data, and allocating the pilot per sub-carrier group based on the basic pilot pattern from the hopped data.

SUMMARY OF THE INVENTION

In view of the foregoing background, it is therefore an object of the present invention to provide an orthogonal frequency-division multiplexing (OFDM) communication system that provides robust security and protection of the pilot tones from interference and fading.

This and other objects, features, and advantages in accordance with the present invention are provided by a communication system that may include at least one wireless communications device comprising a wireless transceiver and a controller cooperating therewith, and a wireless base station comprising a wireless transceiver and a controller cooperating therewith for communicating with the wireless communications device using orthogonal frequency-division multiplexing (OFDM) based upon a plurality of pilot sub-carriers. The controller of the wireless base station may randomly allocate the pilot sub-carriers over time. Advantageously, the pilot sub-carriers are not static and are less susceptible to an interfering device.

In particular, each pilot sub-carrier may be associated with a plurality of sub-carriers to define a plurality of sub-carrier groups. The controller of the wireless base station may randomly allocate by at least dividing the sub-carrier groups into segments, and randomly mapping the pilot sub-carriers onto the segments based upon a mapping set.

Further, communications between the wireless communications device and the wireless base station may be based upon a frame structure including a frame control header and a data block portion. The random mapping of the pilot sub-carriers may be encoded within the frame control header. More specifically, the mapping set may include a first value for a number of sub-carriers in each sub-carrier group, and a second value for a number of consecutive sub-carriers in each sub-carrier group.

In some embodiments, the controller of the wireless base station may randomly allocate the pilot sub-carriers at different frequencies on a frame-by-frame basis. Also, the controller of the wireless base station may further randomly allocate the sub-carrier groups.

In some embodiments, the OFDM may comprise orthogonal frequency-division multiple access (OFDMA). In these embodiments, the wireless transceiver and the controller of the wireless base station may cooperate therewith for communicating with an OFDMA wireless communications device based upon the pilot sub-carriers and symbols. Additionally, the wireless communications device may comprise an IEEE 802.16 wireless communications device, and the wireless base station may comprise an IEEE 802.16 wireless base station.

Another aspect is directed to a method for operating a communication system comprising at least one wireless communications device, and a wireless base station for communicating with the wireless communications device using OFDM based upon a plurality of pilot sub-carriers. The method may include using the wireless base station to randomly allocate the pilot sub-carriers over time.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
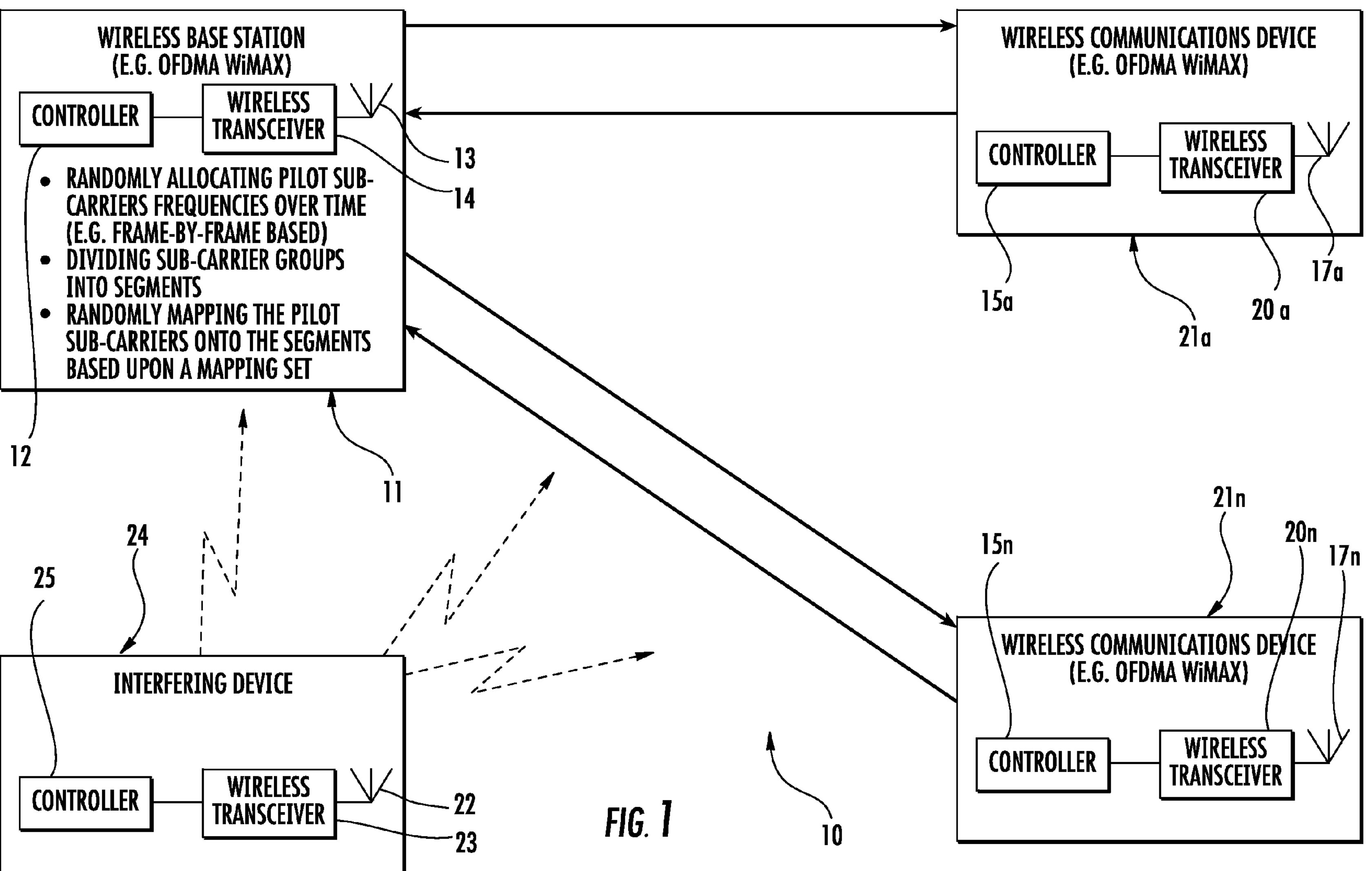
FIG. 1 is a schematic diagram of the communication system according to the present invention.

Referring initially to FIG. 1, a communication system 10 illustratively includes a plurality of wireless communications devices 21*a*-21*n*, each wireless communications device may comprise, for example, an IEEE 802.16 (WiMAX) device, or another orthogonal frequency-division multiple access (OFDMA) device. Each wireless communications device 21*a*-21*n* illustratively includes a wireless transceiver 20*a*-20*n*, a controller 15*a*-15*n* cooperating therewith, and an antenna 17*a*-17*n* coupled to the wireless transceiver.

The communication system 10 also illustratively includes a wireless base station 11 having a wireless transceiver 14, a controller 12 cooperating therewith, and an antenna 13 coupled to the wireless transceiver for communicating with the wireless communications devices 21*a*-21*n*. The wireless base station 11 may also comprise, for example, a WiMAX base station modified in accordance with the teachings herein, or another similarly modified OFDMA wireless base station. Although the communication system 10 is illustrated with two wireless communications devices 21*a*-21*n*, the communication system may alternatively include only one wireless communications device communicating with the wireless base station 11 or may include more than two wireless communications devices communicating with the wireless base station.

Also illustrated is an interfering device 24 including a controller 25, a wireless transceiver 23 coupled to the controller, and an antenna coupled to the wireless transceiver 22. The interfering device 24 illustratively transmits interference (shown with dashed lines) to reduce the operational efficiency of the communication system 10, for example, reduce transmission capacity.

Figure 2:
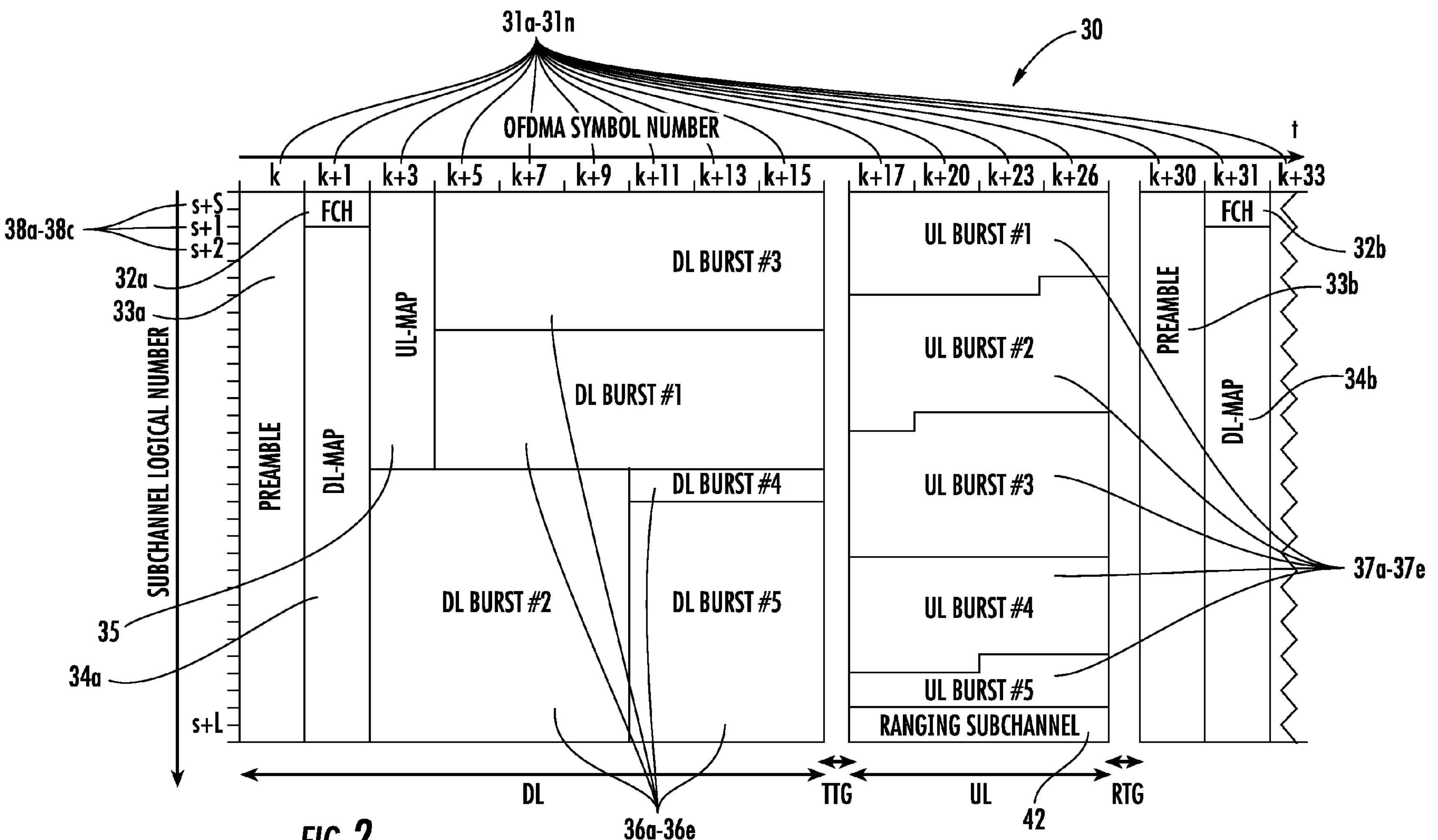
FIG. 2 is a schematic diagram of a frame structure according to the present invention.

Referring now additionally to FIG. 2, as will be appreciated by those skilled in the art, the wireless base station 11 uses orthogonal frequency-division multiplexing (OFDM), for example and as illustrated, OFDMA, which is illustratively based upon a frame structure 30 that is defined by a plurality of sub-carriers 38*a*-38*c*, for example, pilot sub-carriers on the frequency domain, and a plurality of OFDMA symbol numbers 31*a*-31*n* on the time axis. As will be appreciated by those skilled in the art, the wireless base station 11 may use other multi-carrier/multi-tone communications protocols.

As will be appreciated by those skilled in the art, the frame structure 30 illustratively includes a preamble 33*a*-33*b*, a frame control header 32*a*-32*b*, a ranging subchannel 42, respective downlink 34*a*-34*b* and uplink 35 maps, and respective downlink 36*a*-36*e* and uplink data blocks 37*a*-37*e*. Moreover, as also appreciated by those skilled in the art, the pilot sub-carriers may provide certain infrastructure services.

Figure 3:
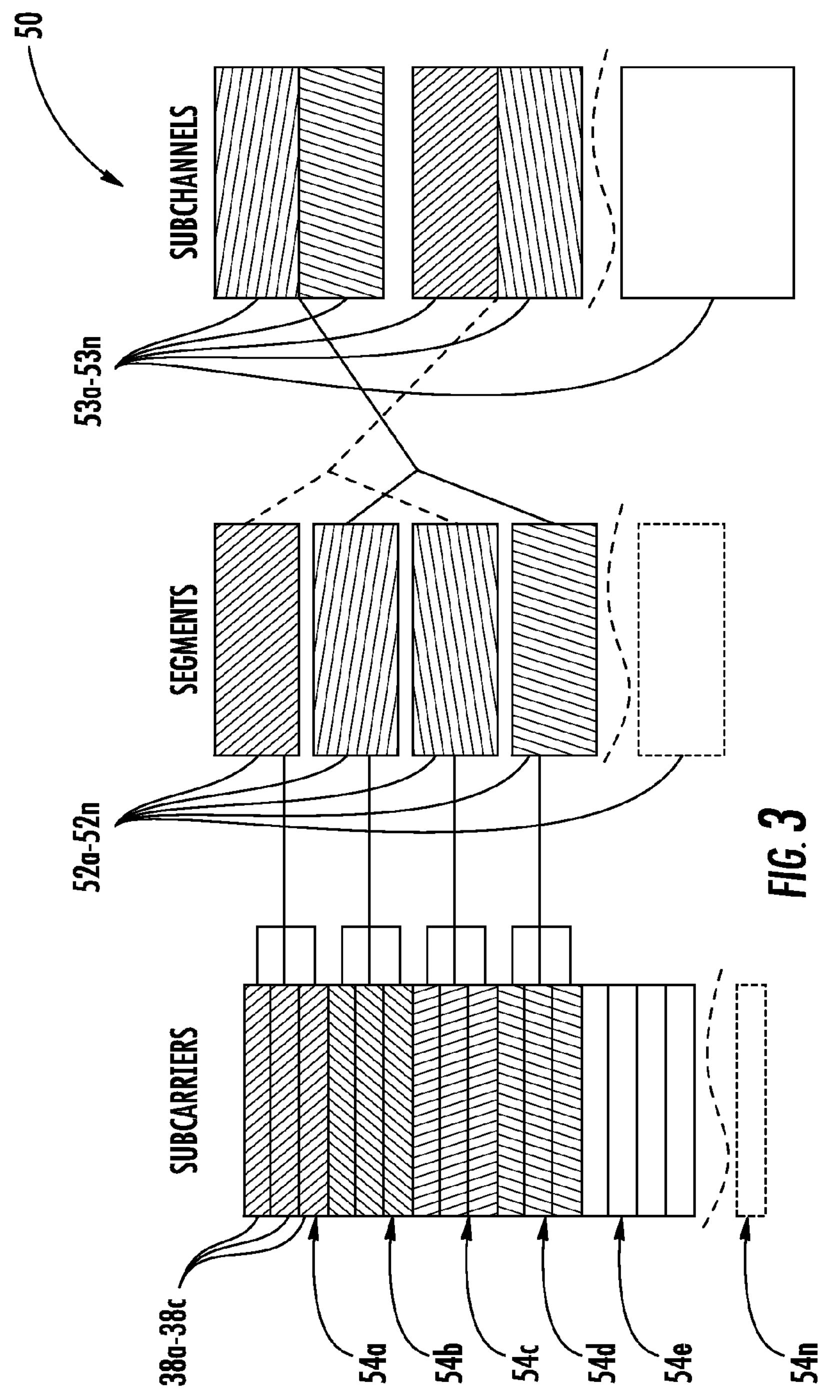
FIG. 3 is a diagram illustrating dividing the sub-carrier groups into segments, and randomly mapping the pilot sub-carriers onto the segments according to the present invention.

Referring now additionally to FIG. 3, advantageously, a diagram 50 illustratively shows the controller 12 randomly allocating the sub-carriers 38*a*-38*c*, including the pilot sub-carriers, over time. In other words, the frequencies of the pilot sub-carriers are selectively changed over time. Also, in some embodiments, the controller 12 of the wireless base station 11 may further randomly allocate the sub-carrier groups 54*a*-54*n* for greater security.

Each pilot sub-carrier is illustratively associated with a plurality of sub-carriers to define a plurality of sub-carrier groups 54*a*-54*n*. The controller 12 of the illustratively randomly allocates the sub-carriers 38*a*-38*c*, including the pilot sub-carriers, by dividing the sub-carrier groups 54*a*-54*n* into segments 52*a*-52*n*, and randomly mapping the pilot sub-carriers onto the segments based upon a mapping set.

As will be appreciated by those skilled in the art, the communication system 10, more particularly, the wireless base station 11, performs a logical allocation of data broadcast requests queued for transmission, typically in the form of sub-carrier groups 54*a*-54*n*, each sub-carrier group including a plurality of sub-carriers 38*a*-38*c*, including the pilot sub-carriers.

The random mapping, i.e. the mapping set, of the sub-carriers 38*a*-38*c*, including the pilot sub-carriers, may be encoded within the frame control header 32*a*-32*b*. Advantageously and as will be appreciated by those skilled in the art, the mapping information is stored within the physical configuration of the frame structure 30.

The mapping set may comprise a plurality of 2-tuple member objects, each 2-tuple including a first value ($N_{subcarriers}$) for a number of sub-carriers 38*a*-38*c* in each sub-carrier group 54*a*-54*n*, and a second value ($N_c$) for a number of consecutive sub-carriers in each sub-carrier group. This mapping set is represented below in formula 1. The mapping set defines the random mapping of the sub-carriers 38*a*-38*c*, pilot and non-pilot, so that it separates the random mapping from the logical allocation of data blocks for the typical WiMAX communication system, for example.

$$S=\{(N_{subcarriers}, N_c)\} \quad (1)$$

Each segment 52a-52n represents a virtual division of the sub-carriers 38a-38c, the controller 12 randomly maps the segments into randomly mapped sub-carrier groups 53a-53n.

The process of dividing the sub-carrier groups 54a-54n uses the following values: $N_{used}$=number of used sub-carriers 38a-38c (data and pilot subcarriers); $N_{sub}$=number of active sub-carrier groups; $N_{subcarriers}$=number of sub-carriers used to form 1 sub-carrier group; $N_{segments}$=number of segments 52a-52n; $N_c$=number of consecutive sub-carriers; and $N_{used}=N_{sub}*N_{subcarriers}$; and $N_{segments}=N_{subcarriers}/N_c$. Each sub-carrier group has a number of subcarriers=$N_{subcarriers}$. Each sub-carrier group is divided into a number of segments 52a-52n=$N_{subcarriers}/N_c$, and each segment has a number of consecutive sub-carriers=$N_c$. The spacing between segments 52a-52n in numbers of sub-carriers=$N_{used}/(N_{subcarriers}/N_c)$.

Advantageously, the random mapping of the sub-carriers 38a-38c may be performed independently of the logical allocation of data in the communication system 10 thereby providing compatibility with existing OFDMA and WiMAX systems, for example. Moreover, the communication system 10 may be compatible with existing sub-carrier permutation and subchannelization methods. In other words, the random allocation of the communication system 10 may not interfere with high level static allocation features, for example, those of WiMAX 802.16e.

In some embodiments, the controller 12 of the wireless base station 11 may randomly allocate the sub-carriers 38a-38c, including pilot sub-carriers, at different frequencies on a frame-by-frame basis. In other words, the frame control header 32a for a first frame includes a different mapping set than the frame control header 32b of a subsequent frame. Advantageously, the pilot sub-carriers 32a-32c have different frequency locations for every frame of the communications, providing robust security from the interfering device 24 monitoring communications to determine pilot sub-carriers 38a-38c.

Another aspect is directed to a method for operating a communication system 10 comprising at least one wireless communications device 21a-21n, and a wireless base station 11 for communicating with the wireless communications device using OFDM based upon a plurality of pilot sub-carriers. The method may include using the wireless base station 11 to randomly allocate the pilot sub-carriers over time.

Moreover, due to the advantageous compatibility of the communication system 10, its security features may be implemented singularly or in conjunction with other security features, for example, those features disclosed in U.S. patent application Ser. No. 11/962,318 to Chauncey et al., the entire contents of which are incorporated by reference, also assigned to the present application's assignee, Harris Corp. of Melbourne, Fla.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

What is claimed is:

1. A communication system comprising:

at least one wireless communications device comprising a wireless transceiver and a controller cooperating therewith; and a wireless base station comprising a wireless transceiver and a controller cooperating therewith and configured to communicate with said at least one wireless communications device using orthogonal frequency-division multiplexing (OFDM) based upon a plurality of pilot sub-carriers;

said controller of said wireless base station configured to randomly allocate the plurality of pilot sub-carriers over time and at random frequencies.

2. The communication system according to claim 1 wherein each pilot sub-carrier is associated with a plurality of sub-carriers to define a plurality of sub-carrier groups; and wherein said controller of said wireless base station is configured to randomly allocate by at least:

dividing the plurality of sub-carrier groups into segments; and randomly mapping the plurality of pilot sub-carriers onto the segments based upon a mapping set.

3. The communication system according to claim 2 wherein said at least one wireless communications device and said wireless base station are configured to exchange communications therebetween and based upon a frame structure including a frame control header and a data block portion; and wherein the random mapping of the plurality of pilot sub-carriers is encoded within the frame control header.

4. The communication system according to claim 2 wherein the mapping set includes a first value for a number of sub-carriers in each sub-carrier group, and a second value for a number of consecutive sub-carriers in each sub-carrier group.

5. The communication system according to claim 2 wherein said controller of said wireless base station is configured to further randomly allocate the plurality of sub-carrier groups.

6. The communication system according to claim 1 wherein said controller of said wireless base station is configured to randomly allocate the plurality of pilot sub-carriers at different frequencies on a frame-by-frame basis.

7. The communication system according to claim 1 wherein the OFDM comprises orthogonal frequency-division multiple access (OFDMA).

8. The communication system according to claim 1 wherein said at least one wireless communications device comprises at least one WiMAX IEEE 802.16 wireless communications device; and wherein said wireless base station comprises an WiMAX IEEE 802.16 wireless base station.

9. A communication system comprising:

at least one orthogonal frequency-division multiple access (OFDMA) wireless communications device comprising a wireless transceiver and a controller cooperating therewith; and an OFDMA wireless base station comprising a wireless transceiver and a controller cooperating therewith and configured to communicate with said at least one OFDMA wireless communications device based upon a plurality of pilot sub-carriers and symbols;

said controller of said OFDMA wireless base station configured to randomly allocate the plurality of pilot sub-carriers at random different frequencies over time.

10. The communication system according to claim 9 wherein each pilot sub-carrier is associated with a plurality of sub-carriers to define a plurality of sub-carrier groups; and wherein said controller of said OFDMA wireless base station is configured to randomly allocate by at least:

dividing the plurality of sub-carrier groups into segments; and randomly mapping the plurality of pilot sub-carriers onto the segments based upon a mapping set.

11. The communication system according to claim 10 wherein said at least one OFDMA wireless communications device and said OFDMA wireless base station are configured to exchange communications therebetween and based upon a frame structure including a frame control header and a data block portion; and wherein the random mapping of the plurality of pilot sub-carriers is encoded within the frame control header.

12. The communication system according to claim 10 wherein the mapping set includes a first value for a number of sub-carriers in each sub-carrier group, and a second value for a number of consecutive sub-carriers in each sub-carrier group.

13. The communication system according to claim 9 wherein said controller of said OFDMA wireless base station is configured to randomly allocate the plurality of pilot sub-carriers on a frame-by-frame basis.

14. A method for operating a communication system comprising at least one wireless communications device, and a wireless base station for communicating with the at least one wireless communications device using orthogonal frequency-division multiplexing (OFDM) based upon a plurality of pilot sub-carriers, the method comprising:

using the wireless base station to randomly allocate the plurality of pilot sub-carriers over time and at random frequencies.

15. The method according to claim 14 wherein each pilot sub-carrier is associated with a plurality of sub-carriers to define a plurality of sub-carrier groups; and further comprising:

dividing the plurality of sub-carrier groups into segments; and randomly mapping the plurality of pilot sub-carriers onto the segments based upon a mapping set.

16. The method according to claim 15 wherein communications between the at least one wireless communications device and the wireless base station are based upon a frame structure including a frame control header and a data block portion; and wherein the random mapping of the plurality of pilot sub-carriers is encoded within the frame control header.

17. The method according to claim 15 wherein the mapping set includes a first value for a number of sub-carriers in each sub-carrier group, and a second value for a number of consecutive sub-carriers in each sub-carrier group.

18. The method according to claim 15 further comprising using the wireless base station to randomly allocate the plurality of sub-carrier groups.

19. The method according to claim 14 wherein randomly allocating further comprises randomly allocating the plurality of pilot sub-carriers at different frequencies on a frame-by-frame basis.

20. The method according to claim 14 wherein the OFDM comprises orthogonal frequency-division multiple access (OFDMA).

* * * * *